2,906,676

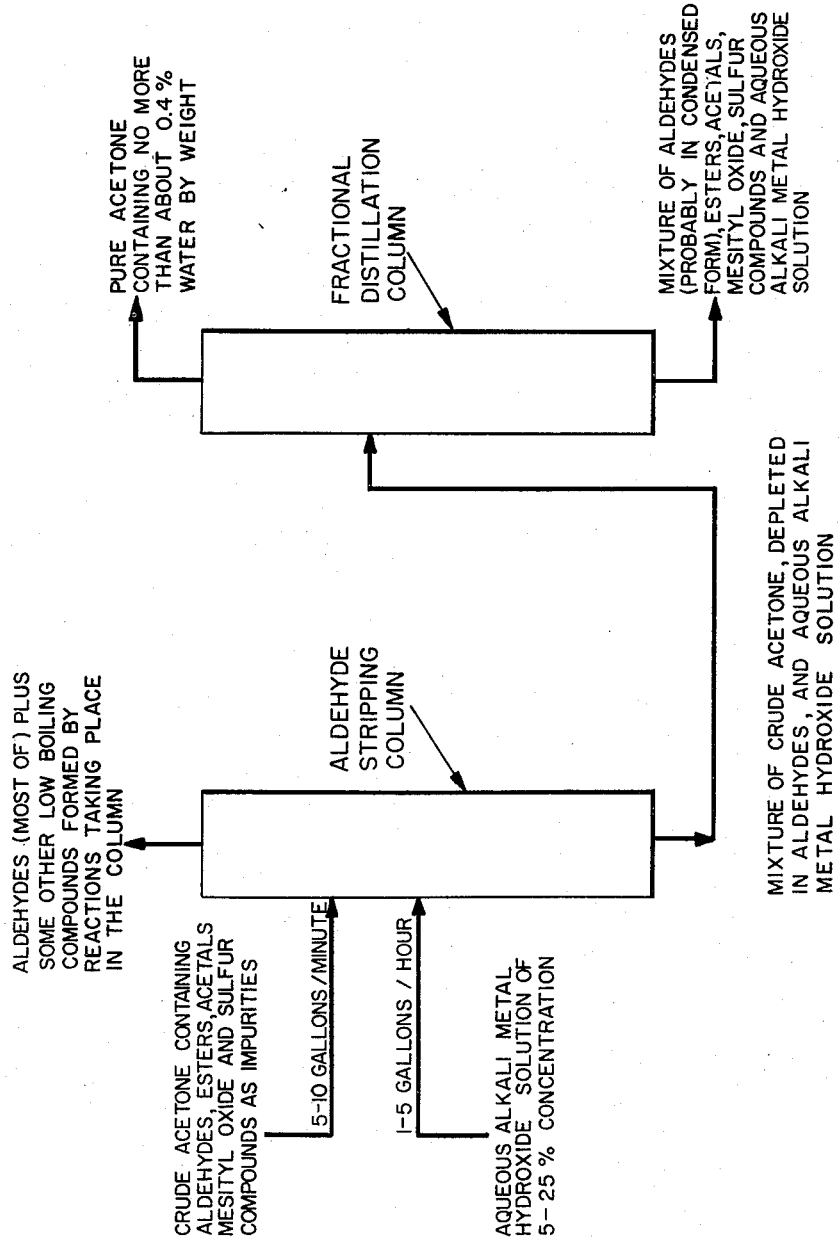
THOMAS BEWLEY
MAURICE DUDLEY COOKE
INVENTOR.
BY Ernest G. Peterson
AGENT United States Patent Office 2,906,676
Patented Sept. 29, 1959

PROCESS FOR PURIFYING CRUDE ACETONE

Thomas Bewley and Maurice Dudley Cooke, Epsom, England, assignors, by mesne assignments, to Hercules Powder Company, a corporation of Delaware Application January 23, 1957, Serial No. 635,922

Claims priority, application Great Britain December 21, 1956

4 Claims. (Cl. 202—57)

The present invention relates to the acid catalysed decomposition of cumene hydroperoxide to phenol and acetone and to the recovery of the products resulting from the decomposition reaction. More particularly, the invention relates to the recovery of pure acetone by distillation of the crude acetone resulting from decomposition of cumene hydroperoxide.

A process has recently been developed which yields acetone and phenol as products and which involves the decomposition of cumene hydroperoxide ($\alpha,\alpha$-dimethylbenzyl hydroperoxide) in the presence of acidic substances to form substantially equimolecular amounts of phenol and acetone. The crude acetone obtained by distillation of the decomposition products contains several impurities and is inadequate to meet the very vigorous specification imposed on commercial acetone. As set forth in ASTM Designation D–329–33, the maximum permissible water content is low, being equivalent to about 0.4% by weight. The same ASTM specification for acetone requires that the colour of potassium permanganate added to the acetone be retained for a minimum period of 30 minutes. The colour retention test is made by adding 1 ml. of 0.1% by weight of $KMnO_4$ to 100 ml. of the acetone sample and allowing the mixture to stand at 25° C. in the dark. With respect to many commercial uses of acetone, it is desirable that the water content be even lower than the maximum permissible under the ASTM designation mentioned above. Furthermore, with respect to many other commercial uses of acetone it is necessary that the colour retention time in the permanganate test be considerably in excess of the 30 minutes specified, and even considerably in excess of, for instance, 4 hours.

The failure in the permanganate test of the acetone obtained by distillation of cumene hydroperoxide decomposition products has been attributed to aldehydic impurities. In addition to the aldehydic impurities the crude acetone obtained from decomposition of cumene hydroperoxide also contains esters, acetals and mesityl oxide and these compounds may contribute to failure of the acetone in the permanganate test. It has additionally been found that the crude acetone contains sulphur compounds, probably mercaptans, which give to the acetone a bad odour and make it undesirable for certain uses.

In accordance with this invention it has been found that the aldehydic impurities, mesityl oxide, esters, acetals and the sulphur compounds all may be removed from the crude acetone obtained by decomposition of cumene hydroperoxide, by distilling the crude acetone under such conditions that the various impurities either are retained in the distillation column or are converted into materials which are less volatile than acetone, and furthermore that the acetone thus produced has a colour retention time in the permanganate test very considerably in excess of the value required by the ASTM designation mentioned above, and/or a water content substantially lower than the maximum permissible under the same designation. The process of this invention involves the introduction of the crude acetone continuously into a fractional distillation column at an intermediate point in said column, continuously adding to the column, at the acetone feed point, an aqueous solution of an alkali metal hydroxide selected from the group consisting of sodium hydroxide and potassium hydroxide, and removing pure acetone as the overhead stream from the column.

By introducing the aqueous hydroxide solution into the column at the acetone feed point, it is possible to obtain product acetone overhead of acceptable water content and having a colour retention time in the permanganate test very substantially in excess of the minimum period specified in the ASTM designation. In a preferred embodiment the aqueous hydroxide solution is added to the column at the acetone feed point in admixture with the acetone feed.

The process of this invention is illustrated by the drawing and by the following example wherein all parts are on a weight basis unless otherwise specified.

Example

The cumene hydroperoxide feed used in this example was prepared by oxidising cumene with air to obtain an oxidate containing approximately 25% cumene hydroperoxide. This oxidate then was subjected to distillation to remove substantially all of the unreacted cumene. The hydroperoxide concentrate so formed contained about 90% hydroperoxide and the remaining components were $\alpha,\alpha$-dimethylbenzyl alcohol, acetophenone and a small amount of cumene.

The concentrated cumene hydroperoxide feed was decomposed by adding it to a reaction medium composed of acetone and concentrated sulphuric acid. The amount of acid based on the acetone was about 1% by weight. The acetone had a water content between about 0.5 and 5% by weight. The decomposition reaction was carried out continuously with introduction of the hydroperoxide, acetone and acid into the reactor and withdrawal from the reactor of decomposition products after the reaction had reached a steady state. The decomposition reaction mixture in the reactor was cooled by vapourisation of acetone, the acetone vapours passing from the reactor to a condenser where the vapours were condensed and then returned to the reactor.

The decomposition reaction products which were withdrawn from the reactor were then washed with sodium phenate to neutralise the sulphuric acid contained in the reaction mixture and the sodium sulphate formed by the neutralisation was separated. The neutralised decomposition products then were subjected to distillation to remove as an overhead fraction crude acetone. The bottoms fraction containing the phenol and other products was subjected to a series of distillations for the purpose of recovering pure phenol.

The crude acetone fraction obtained above was first subjected to a stripping operation for the purpose of removing as many aldehydic impurities as possible. The stripped product was then introduced into a fractionating column containing 55 trays. The crude acetone was introduced at the thirty-fourth tray from the top of the column at a rate of about 10 gallons per minute. Simultaneously there was added at the same tray aqueous 10% sodium hydroxide solution at a rate of about 2.7 gallons per hour. After steady conditions had been attained, pure acetone was taken off from the top of the column at a rate of about 5.5 gallons per minute.

The pure acetone taken from the top of the column had a water content of 0.4% by weight and a permanganate retention period of greater than 144 hours. The acetone had an aldehyde content of 0.005%, a distillation range of 0.4° C., a colour value (Hazen) of less than 5, and passed the odour test.

When the above operating conditions were duplicated, except for omission of the introduction of the aqueous sodium hydroxide solution to the acetone fractional distillation column, the product acetone obtained was poor in colour and failed to pass the permanganate specification.

The process as described above is most advantageous in that a pure acetone product may be obtained. Not only are aldehydic and sulphur-containing impurities removed, it also is possible through operation of the described process to prevent mesityl oxide from being found in the acetone product. In addition, the alkali in the aqueous hydroxide solution neutralises volatile acids which tend to catalyse self-condensation of the acetone. The mechanism whereby the aldehydic, sulphur-containing and other impurities are removed is not completely understood. Some of the sulphur may be mercaptans which form involatile salts with sodium hydroxide and potassium hydroxide. The aldehydic impurities may condense or react in such a manner that other involatile products are produced. In any event a major problem confronting operation of the process of producing phenol and acetone from cumene hydroperoxide has been overcome.

In a preferred embodiment of the invention the aqueous hydroxide solution is added to the fractional distillation column at the acetone feed point in admixture with the acetone feed. In such a process the aqueous caustic may be mixed with the crude acetone immediately prior to its addition to the column. Alternatively, where the fractional distillation column is operated in conjunction with a prior aldehyde stripping column, the aqueous caustic may be introduced into the aldehyde stripping column, preferably at a point below the feed point but above the base of that column. The aqueous caustic will then be withdrawn in admixture with crude acetone from the bottom of the aldehyde stripping column, this mixture being subsequently fed at an intermediate point into the fractional distillation column for the production of pure acetone, and in addition the alkali will react with esters and acetals in the aldehyde stripping column to produce low-boiling compounds which will be removed overhead in this column.

The fractional distillation column is preferably operated at a reflux ratio of about 3:1 or higher at the top of the column.

Although the example has shown the use of aqueous sodium hydroxide solution, aqueous solutions of potassium hydroxide also are operable. The concentration of these solutions may vary over a moderately wide range. A suitable range of concentrations is between about 1 and about 25% sodium hydroxide or potassium hydroxide. A more desirable concentration range is between about 5 and about 25%, and the preferred concentration is between about 10 and about 25%. The aqueous hydroxide solutions are added to the acetone fractional distillation column at a rate varying between 5 gallons per hour to 1 gallon per hour for crude acetone feed rates which are in the range of about 5 to about 10 gallons per minute. The rate of addition of the aqueous hydroxide solutions depends upon their concentration. For example, a 5% aqueous sodium hydroxide solution is desirably added at a rate of about 5 gallons per hour whereas a 25% sodium hydroxide solution is preferably added at a rate of about 1 gallon per hour.

The use of aqueous sodium hydroxide or aqueous potassium hydroxide in accordance with the process of this invention, in addition to improving the permanganate time of the recovered acetone and the odour of the acetone, also neutralises the minor amount of acids and phenol existing in the column thereby reducing the corrosion of mild steel. These advantages constitute a marked advance in the art and provide a more economical process for converting cumene hydroperoxide to phenol and acetone.

We claim:

1. The process for the purification of the crude acetone obtained by the decomposition of cumene hydroperoxide and containing aldehydes, esters, acetals, mesityl oxide and sulphur compounds as impurities which comprises continuously introducing said acetone at a rate in the range of about 5 to about 10 gallons per minute into an aldehyde stripping column wherein the major part of the aldehydic impurities is removed, also continuously introducing into said column an aqueous solution of about 5 to about 25% concentration of an alkali metal hydroxide selected from the group consisting of sodium hydroxide and potassium hydroxide, the aqueous hydroxide solution being introduced at a rate varying between about 5 gallons per hour when the concentration is about 5% and about 1 gallon per hour when the concentration is about 25%, continuously withdrawing from the base of said column a mixture of crude acetone and alkali metal hydroxide solution, continuously feeding said mixture into a fractional distillation column at an intermediate point in said column, and removing pure acetone as an overhead stream from said fractional distillation column.

2. The process of claim 1 wherein the alkali metal hydroxide is potassium hydroxide.

3. The process of claim 1 wherein the alkali metal hydroxide is sodium hydroxide.

4. The process of claim 1 wherein the alkali metal hydroxide solution is introduced into the prior aldehyde stripping column at a point below the feed point but above the base of the column.

References Cited in the file of this patent

UNITED STATES PATENTS

| | | |
|---|---|---|
| 2,555,185 | Cromeans | May 29, 1951 |
| 2,624,699 | Joris | Jan. 6, 1953 |
| 2,662,848 | Emerson et al. | Dec. 15, 1953 |
| 2,737,480 | Adams et al. | Mar. 6, 1956 |